US005154758A

United States Patent [19]

Olsen

[11] Patent Number: 5,154,758

[45] Date of Patent: Oct. 13, 1992

[54] SILICONE BASED WATERPROOFING MATERIAL HAVING LOW VOLATILE ORGANIC CHEMICALS

[75] Inventor: Thomas O. Olsen, Wichita, Kans.

[73] Assignee: Professional Products of Kansas, Inc., Wichita, Kans.

[21] Appl. No.: 698,948

[22] Filed: May 13, 1991

[51] Int. Cl.[5] ................ C09K 3/18

[52] U.S. Cl. ................ 106/2; 106/14.05; 106/14.41

[58] Field of Search ................ 106/2, 14.05, 14.41; 524/315, 588

[56] References Cited

U.S. PATENT DOCUMENTS

| | | | |
|---|---|---|---|
| 2,751,314 | 11/1954 | Kiel | 106/287.13 |
| 2,934,464 | 4/1960 | Hoffman et al. | 524/264 |
| 2,979,420 | 4/1961 | Harper | 427/409 |
| 4,105,617 | 8/1978 | Clark et al. | 524/588 |
| 4,144,216 | 8/1979 | Clark et al. | 524/588 |
| 4,683,251 | 7/1987 | Mikami | 524/315 |

*Primary Examiner*—Mark L. Bell
*Assistant Examiner*—Deborah Jones
*Attorney, Agent, or Firm*—Shook, Hardy & Bacon

[57] ABSTRACT

An improved silicone rubber waterproofing composition having a low volatile organic chemicals content is the subject of the present invention. The composition comprises an RTV silicone rubber, a small but effective quantity of amyl acetate, and a solvent comprising mineral spirits and trichloroethane or its equivalent. The composition is highly penetrable, has a long residual life and is not subject to UV degradation. It meets the most stringent environmental regulations but is still economical to manufacture and exhibits low combustibility after curing.

4 Claims, No Drawings

SILICONE BASED WATERPROOFING MATERIAL HAVING LOW VOLATILE ORGANIC CHEMICALS

BACKGROUND OF THE INVENTION

This invention relates generally to waterproofing compositions and, more particularly, to an improved silicone rubber coating composition characterized by a relatively low percentage of volatile organic chemicals.

Silicone rubbers are known as useful in various types of protective coating compositions. Typical compositions of the prior art are found in U.S. Pat. Nos. 2,751,314; 2,934,464; 2,979,420; 4,144,216; and 4,105,617.

Prior art formulations incorporating silicone rubbers are known to be expensive to manufacture and are characterized by a high percentage of volatile organic chemicals to which there is presently considerable environmental objection. The present invention overcomes the limitations of many of the prior art formulations by providing a composition which is economical to manufacture and has a relatively low volatile organic content.

It is therefore a primary object of the present invention to provide a silicone based water composition which is highly penetrable, has long residual life, is economical to manufacture and produces little environmental pollution upon use.

An object of this invention is also to provide a silicone waterproofing composition which meets the object set forth above and is not subject to sunlight degradation, particularly by ultra-violet rays.

Still another one of the objects of my invention is to provide a silicone rubber based waterproofing composition which is economical to manufacture, has a low volatile organic chemical content and can be safely applied by operators without the need for special equipment.

An aim of this invention is to provide a silicone waterproofing composition meeting by objectives set forth previously which can be used on masonry, wood and asphalt substrates.

Another object of this invention is to provide a silicone rubber base waterproofing composition meeting the objects set forth above which, after curing, exhibits very low combustibility and thus may be safely applied to wood and other combustible materials utilized in building construction without presenting a fire hazard.

Other aims and objects of this invention will be made clear or become apparent from the following description and claims.

The process for the manufacture of silicone rubber is well known to those skilled in the art and is described in expired U.S. Pat. No. 2,380,955. The term "silicone rubber" as used throughout this specification and the attendant claims is intended to include any polysiloxane which has been crosslinked. Most silicone rubbers are predominantly methyl polysiloxane but the polymer may also contain other organic group substituents on the polymer chain such as phenyl or vinyl. Typical crosslinking agents for silicone rubbers are organic peroxides, especially benzoyl peroxide and its derivatives. A particularly useful silicone rubber is dimethyl polysiloxane having a molecular weight of about 500,000. The silicone rubber which is employed should be a room temperature vulcanizing (RTV) silicone so that it will crosslink at room temperature either through the addition of a catalyst or by moisture in the air.

The silicone polymer which is a component of the composition according to the invention is dissolved in a nonreactive organic solvent which may comprise from 67 to 96 percent by weight of the final composition. The solvent may comprise one or more of the following compounds: trichloroethane, methylene chloride, trichlorofluoromethane, dichlorodifluoromethane, chlorodifluoromethane, dichlorotetrafluoroethane, trifluoromethane, chloropentafluoroethane and trichlorotrifluoroethane. For economic reasons, it is preferable for the solvent to also comprise up to forty percent by weight mineral spirits, preferably thirty to forty percent, and most preferably approximately 38 percent (by weight). The silicone rubber may comprise from three to thirty percent by weight of the final composition and preferably about five to ten percent by weight.

It has been discovered that utilizing a relatively small percentage of amyl acetate in the composition greatly enhances its performance as a waterproofing material. The quantity of amyl acetate is at least one percent by weight but not more than about three percent by weight. While the exact mechanism by which the amyl acetate and the organic solvent for the silicone work in a synergistic manner is not fully understood, it is believed that the amyl acetate breaks the silicone polymer into smaller units so as to substantially increase its penetrability without deleterious side effects. If, however, the quantity of amyl acetate exceeds about three percent by weight, the silicone rubber is broken down to an extent that it no longer serves as an effective waterproofing barrier.

The mineral spirits utilized in the preferred formulation should have a low naphtha content and virtually negligible quantities of sulphur. The total aromatic composition of the mineral spirits should be less than about two percent by weight.

A general formula for the composition according to the invention is:

3–30 percent by weight RTV silicone rubber

1–3 percent amyl acetate

67–96 percent by weight of one or more of the following: trichloroethane, methylene chloride, trichlorofluoromethane, dichlorodifluoromethane, chlorodifluoromethane, dichlorotetrafluoroethane, trifluoromethane, chloropentafluoroethane and trichlorotrifluoroethane.

As previously indicated, the composition may include up to forty percent by weight mineral spirits of the type described as one of the components of the solvent.

A preferred composition formulation according to the invention is as follows:

5–10 percent by weight RTV silicone, acetic acid cure.

1 percent by weight amyl acetate.

30–40 percent by weight mineral spirits of the type described.

49–64 percent by weight 1,1,1-trichloroethane.

As indicated previously, methylene chloride, trichlorofluoromethane, dichlorodifluoromethane, chlorodifluoromethane, dichlorotetrafluoroethane, trifluoromethane, chloropentafluoroethane, and trichlorotrifluoroethane may be substituted for the 1,1,1-trichloroethane.

The composition is prepared by first mixing the mineral spirits and the trichloroethane and then adding the RTV silicone and amyl acetate to this solvent mixture with mixing. The composition may be applied as a waterproofing material by brushing or spraying, although spraying is the preferred application technique. The application rate can vary widely, but a preferred rate is one gallon per 200 square feet.

A particular advantage of the composition according to the invention is that it has a relatively low volatile organic chemical content and, accordingly, can meet the most stringent environmental regulations. These advantages in terms of environmental impact have been achieved without detracting from the effectiveness of the composition. It is, however, important that the relative percentages of the components of the composition be maintained as set forth herein to achieve the desired results.

As previously indicated, the composition according to the invention is useful in waterproofing any material which is capable of absorbing the composition but it is particularly well adapted for use on masonry and concrete surfaces. Its high penetrability and good adhesion provide for superior waterproofing properties.

It is to be understood that the foregoing description of the invention and the uses to which it may be put are only exemplary in nature. The scope of the invention is intended to be limited only by the appended claims.

Having thus described the invention, I claim:

1. A waterproofing composition comprising:

3-30% by weight RTV silicone rubber;

1-3% by weight amylacetate; and

67%-96% by weight of a solvent comprising mineral spirits in an amount of up to 40% by weight of the total composition and one or more of the following: trichloroethane, methylene chloride, trichlorofluoromethane, dichlorodifluoromethane, chlorodifluoromethane, dichlorotetrafluoroethane, trifluoromethane, chloropentafluoroethane, and trichlorotrifluoroethane.

2. A waterproofing composition as set forth in claim 1, wherein said RTV silicone rubber is acetic acid cure RTV silicone.

3. A waterproofing composition as set forth in claim 1, wherein the solvent comprises trichloroethane in an amount of between 50 to 60% by weight of the total composition.

4. A waterproofing composition comprising 5-10% by weight RTV silicone rubber, 1% by weight amyl acetate, 30-40% by weight mineral spirits and 49-64% by weight 1,1,1-trichloroethane.

* * * * *